April 7, 1970  V. W. CRIST  3,504,892

SELF-CONTAINED ELECTRIC FENCE CONTROL CABLE

Filed Nov. 19, 1968  2 Sheets-Sheet 1

Vernon W. Crist
INVENTOR.

Vernon W. Crist
INVENTOR.

United States Patent Office 3,504,892
Patented Apr. 7, 1970

3,504,892
SELF-CONTAINED ELECTRIC FENCE CONTROL CABLE
Vernon W. Crist, Wessington Springs, S. Dak., assignor to Sta Tite Corporation, a corporation of Minnesota
Filed Nov. 19, 1968, Ser. No. 776,957
Int. Cl. A01k 3/00
U.S. Cl. 256—10                              4 Claims

ABSTRACT OF THE DISCLOSURE

A flexible cable assembly for electrically charged fences in which an electrical potential difference is established between adjacent spaced contact surfaces at longitudinally spaced locations. A pair of wire conductors are mounted in spaced, insulated relation to each other by the cable assembly but are electrically exposed through contact plates for example, at the longitudinally spaced locations. Adjacent contact plates are adapted to be bridged by an animal engaging the fence completing a circuit through the conductors to impart a repelling shock to the animal for controlled feeding purposes or the like.

This invention relates to improvements in electrically charged fences for the purpose of regulating the movement or position of animals by imparting an electrical shock to any animal coming in contact with the fence.

Generally, electrically charged fences are designed to impart an electrical shock to an animal by establishing an electrical current path between ground and a source of electrical potential through the animal. However, when the ground or soil conditions are dry or frozen, there is a sharp increase in the electrical resistance of the current path through ground so as to reduce the current flow and shock sometimes to such a low value that the electrically charged fence becomes ineffective. In order to correct this condition, a third ground wire is sometimes installed either above or below the live wire. However, there are instances when this arrangement cannot be satisfactorily utilized as in the case of the controlled feeding of cattle from a feeding pile of hay or silage, confinement and feeding of sheep, and for cow trainers in dairy barns.

Brief summary of the invention

An electric cable assembly for an electrically charged fence including a pair of insulated wire conductors having a plurality of flat conductor plates mounted thereon, alternate plates having electrical contact with the same conductor so that the cable assembly will produce a local shock when adjacent plates are contacted by an animal.

An important object of the present invention therefore is to provide an electrified cable assembly for an electrically charged fence which is not dependent on the surface on which the animal is standing and will therefore be effective during dry or frozen soil conditions without any danger of over-shock when soil conditions are ordinarily suitable. The cable assembly because of its construction and ease of installation, will be versatile in use whenever an electrically charged fence is needed.

In accordance with the present invention, the electrically charged, flexible cable assembly includes a pair of wire conductors connected to a voltage source and mounted in constant spaced relation to each other by flexible insulator means with facilities for electrically exposing the wire conductors at longitudinally spaced locations. At each of such locations, the wire conductors maintained at a regulated potential difference will be exposed through closely spaced contact surfaces adapted to impart a repelling shock to any animal engaging and bridging the contact surfaces. In one form of the invention, the cable assembly consists of non-conductive tube sections enclosing the wire conductors which are maintained in parallel spaced relation to each other by longitudinally spaced contact plates through which the wire conductors extend. Alternate contact plates, are electrically connected to different wire conductors between adjacent ends of the tube sections, each contact plate also having a tube section extending therethrough insulating it from the other wire conductor.

These together with other objects and advantages which will become subsequently apparent reside in the details of construction and operation as more fully hereinafter described and claimed, reference being had to the accompanying drawings forming a part hereof, wherein like numerals refer to like parts throughout, and which:

Figure 1:
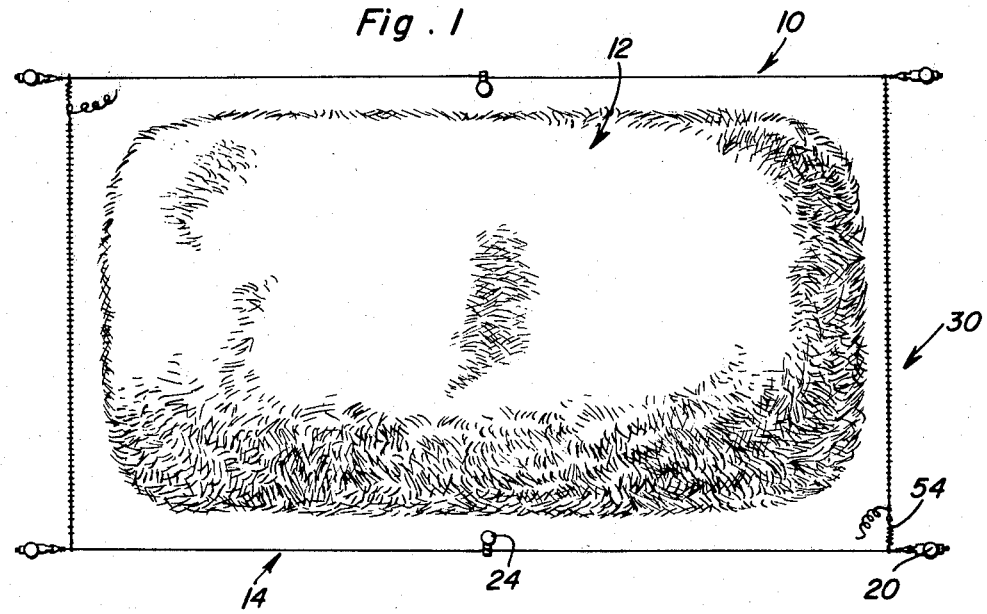
FIGURE 1 is a top plan view of one type of installation for the cable assembly of the present invention.
Figure 2:
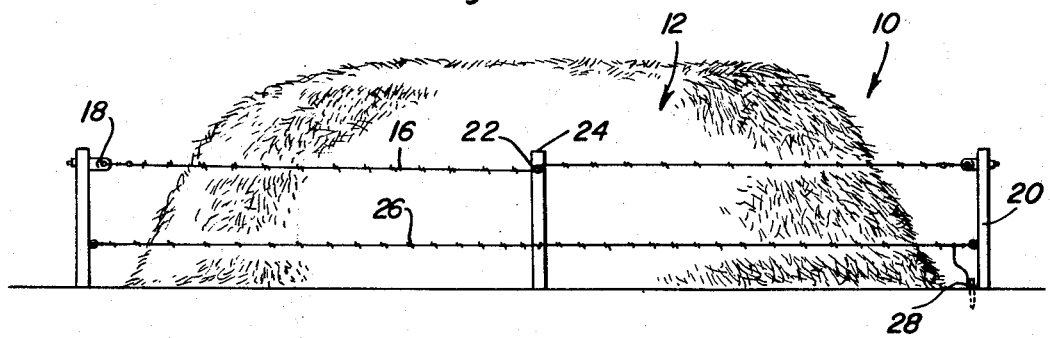
FIGURE 2 is a side elevational view of the installation shown in FIGURE 1.

Referring now to the drawings in detail, FIGURES 1 and 2 illustrate one type of electrically charged fence installation generally denoted by reference numeral 10. The fence installation is adapted to enclose a feeding pile 12 for the purpose of regulating or controlling the feeding of cattle therefrom. The fence installation includes spaced sides 14 each of which is formed by a top barbed wire 16 connected to insulated anchors 18 supported adjacent the tops of end posts 20 and also supported by insulated connections 22 adjacent the upper ends of intermediate posts 24. Also supported between the posts in spaced relation below the top barbed wire 16, is a lower barbed wire 26 connected to ground by a ground connection 28 for example as shown in FIGURE 2. A source of electrical voltage is applied to the top wire 16 in order to establish a potential difference between the top wire and the lower ground wire 24 for imparting a repelling shock to any animal engaging the sides 14 of the fence assembly.

Figure 3:
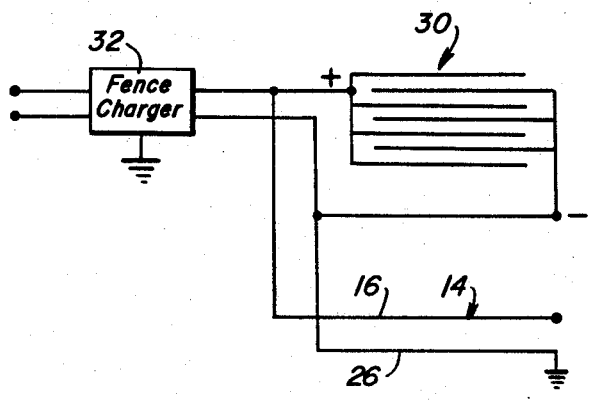
FIGURE 3 is an electrical circuit diagram corresponding to the installation shown in FIGURES 1 and 2.

The open ends of the fence sides 14 have suspended therebetween at adjusted positions, a pair of flexible cable assemblies generally denoted by reference numeral 30 in FIGURE 1. The cable assemblies 30 are electrically charged by the same voltage source to which the barbed wires of the fence sides 14 are connected, as diagrammatically shown in FIGURE 3 wherein the fence charger 32 to which a source of voltage is connected, maintains a regulated potential on the top wires 16 of the fence sides 14. A regulated potential difference is also maintained between dielectrically spaced conductors associated with the cable assemblies 30.

Figure 4:
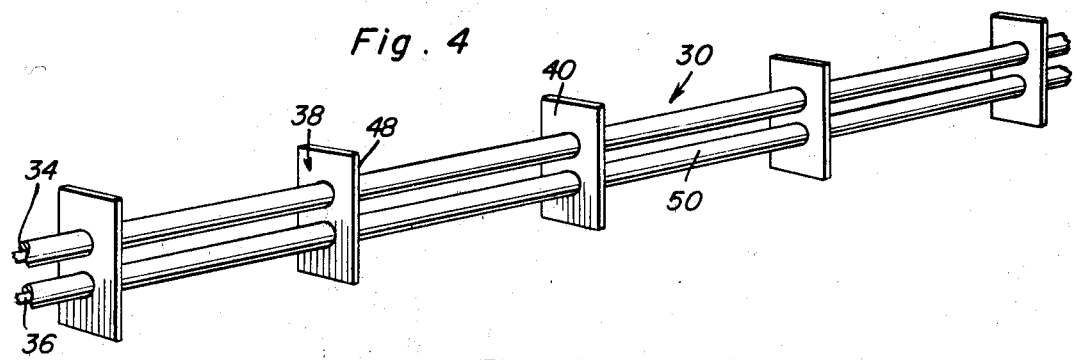
FIGURE 4 is a perspective view illustrating a section of one of the cable assemblies shown in FIGURE 1.
Figure 5:
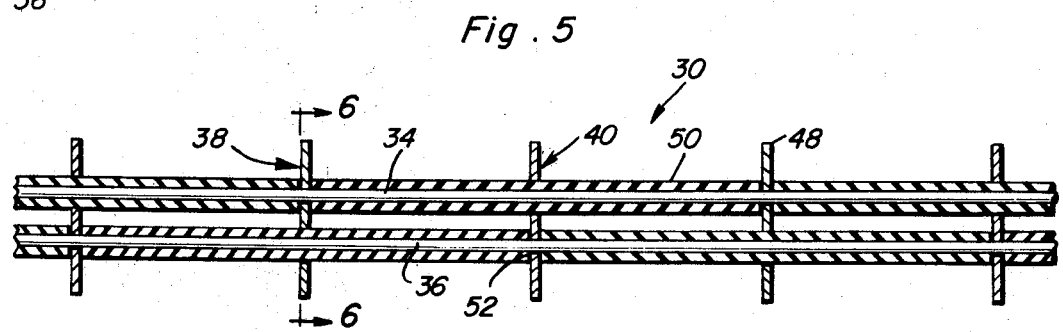
FIGURE 5 is a longitudinal side sectional view of the cable assembly shown in FIGURE 4.
Figure 6:
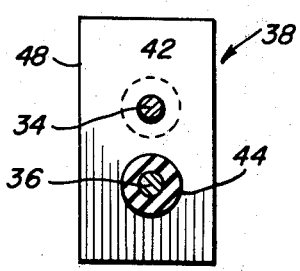
FIGURE 6 is a transverse sectional view taken substantially through a plane indicated by section line 6—6 in FIGURE 5.
Figure 7:
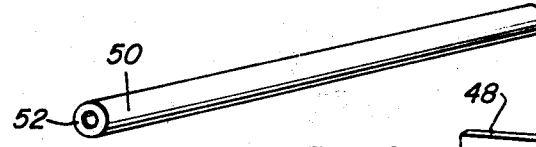
FIGURE 7 is a perspective view of one of the tube sections utilized in the cable assembly.
Figure 8:
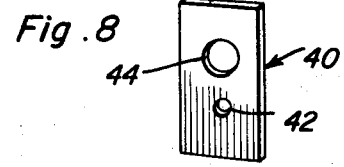
FIGURE 8 is a perspective view of one of the contact plates utilized in the cable assembly.

Referring now to FIGURES 4 and 5, a section of one type of cable assembly 30 is shown in detail. This cable assembly includes a pair of parallel spaced wire conductors 34 and 36 which are supported in constant spaced relation to each other by a plurality of longitudinally spaced contact plates 38 and 40. These contact plates are identical to each other except for the relative positioning of a small diameter aperture 42 and a large diameter aperture 44 as more clearly shown in FIGURES 6 and 8. The contact plates as shown in the illustrated embodiment, are rectangular in shape as defined by the outer peripheral contact edge surface 48 thereof. It will of course be appreciated that other shaped contact plates could be utilized such as circular contact plates. In any event, the plates project outwardly of the cable assembly for the purpose of penetrating the hair of any animal as it approaches the cable assembly.

The smaller diameter aperture 42 of each contact plate is substantially equal to the diameter of the wire conductors 34 and 36 so as to establish electrical contact between the contact plate and the wire conductor extending through the small diameter aperture. The larger diameter aperture 44 on the other hand is substantially equal in diameter to the outer diameter of the flexible tube sections 50 which are made of a non-conductive material for insulating the wire conductors from the contact plates.

The axial length of each tube section 50 between the axial ends 52, is substantially equal to twice the distance between contact plates 38 and 40 so that adjacent tube sections enclosing the wire conductor 36 will be separated by contact plates 40 as more clearly seen in FIGURE 5 on opposite sides of the smaller diameter apertures 42. The tube sections enclosing the other wire conductor 34 extend through the larger diameter apertures 44 of the contact plates 40 so as to insulate the wire conductor from the contact plates. The tube sections enclosing the wire conductor 34 therefore extend between alternate contact plates 38 in axially staggered relation to the tube sections enclosing the wire conductor 36.

It will be apparent from the foregoing description of the flexible cable assembly 30, that when a conductive path is established between alternate contact plates 38 and 40, current will flow through the conductors 34 and 36 from the voltage source which maintain the alternate contact plates 38 and 40 at a regulated potential difference. The conductors 34 and 36 are nevertheless maintained in insulated spaced relationship to each other, being electrically exposed through the contact surfaces 48 of the contact plates in order to impart a repelling shock to any animal that may engage the cable assembly. The cable assemblies may be adjustably positioned between the sides 14 of the electrically charged fence installation in order to control feeding of cattle from the feeding pile 12 as it is diminished in size from the open ends of the fence sides 14. The cable assemblies are suspended in any suitable fashion under the proper tension between the fence sides 14 utilizing for example a yieldable anchor spring 54 at one end as diagrammatically shown in FIGURE 1.

Figure 9:
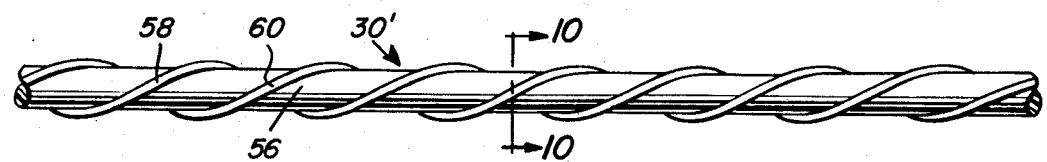
FIGURE 9 is a side elevational view of another form of cable assembly constructed in accordance with the present invention.
Figure 10:
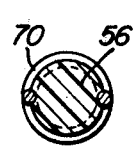
FIGURE 10 is a transverse sectional view taken substantially through a plane indicated by section line 10—10 in FIGURE 9.

FIGURES 9 and 10 illustrate another form of cable assembly 30' which may be used in lieu of the cable assemblies 30 hereinbefore described. In this form of cable assembly, a cross-sectionally solid, flexible rod 56 is utilized to support and mount a pair of wire conductors 58 and 60 in constant parallel spaced relation to each other. The rod 56 is provided with a pair of parallel spaced, helical grooves 70 on the external surface thereof within which the wire conductors are seated. Accordingly, portions of the wire conductors will be electrically exposed at longitudinally spaced locations along the cable rod 56. The conductors are connected to a votage source as hereinbefore indicated in connection with the cable assembly 30 in order to maintain a regulated potential difference between spaced contact surface locations along the cable assembly thereby imparting a repelling shock to any animal brushing against the cable assembly and bridging adjacent contact surfaces of the wire conductors.

It should be understood that the cable assemblies described will be useful wherever animals are to be controlled or confined on a non-conductive surface such as concrete and asphalt. Thus, the invention is applicable to installations other than that specifically described including hard surface driveways across which gates are placed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an electrically charged fence having a source of voltage,
 a cable assembly comprising a plurality of flexible tubular insulator sections made of electrically nonconductive material,
 a pair of wire conductors extending through said sections and connected to a source of electrical current,
 a plurality of contact plates at contact locations, each of said contact plates having a pair of apertures therein through which the conductors extend in substantially parallel spaced relation to each other, one of said apertures in each contact plate being smaller in diameter than the tubular section of the flexible insulator section to establish electrical contact with one of the conductors, the other of the apertures being substantially equal in diameter to the tubular section of the flexible insulator tubular section to receive the other of the conductors in nonconductive spaced relation to the contact plate, said tubular sections on one of said conductors extending through the larger diameter apertures of the contact plates which axially space the tubular sections on the other of the conductors, alternate ones of said contact plates being electrically connected to the same one of the conductors, and each of said tubular sections being substantially equal in axial length but twice the distance between adjacent contact locations.

2. In an electrically charged fence having a source of voltage, a cable assembly comprising elongated flexible insulator means made of electrically nonconductive material, a pair of wire conductors connected to said source,
 a plurality of contact plates mounting said conductors along the flexible insulator means in constant spaced relation to each other throughout and exposing said conductors at axially spaced contact locations along the flexible insulator means, alternate ones of said contact plates being electrically connected to the same one of the conductors, each contact plate having a pair of apertures therein through which the conductors extend in substantially parallel spaced relation to each other, one of said apertures in each of said contact plates being smaller in diameter than the flexible insulator means to establish electrical contact with one of the conductors, the other of the apertures being substantially equal in diameter to the flexible insulator means to receive the other of the conductors in nonconductive spaced relation to the contact plate.

3. In an electrically charged fence,
a cable assembly comprising a pair of spaced apart parallel fire conductors connected to a source of electrical current,
flexible insulator means formed of electrical nonconductive material and electrically insulating said conductors from each other and from the exterior,
a plurality of substantially similar flat conductor plates fixedly mounted on the cable assembly in spaced apart closely proximal relation with respect to each other, and each plate extending transversely of the cable assembly, alternate of said plates engaging and having an electrical contact with the same one of said conductors so that a potential difference is produced at adjacent plates when the cable is energized, each of said plates extending outwardly from substantially the entire periphery of the cable assembly and each plate having a peripheral edge defining a plurality of relatively sharp points capable of penetrating the hair of an animal to produce a local electrical shock by adjacent contacted conductor plates.

4. The invention as defined in claim 3 wherein each of said conductor plates is of substantially rectangular configuration.

References Cited

UNITED STATES PATENTS

| | | | |
|---|---|---|---|
| 252,599 | 1/1882 | Connelly | 256—10 |
| 2,270,684 | 1/1942 | Kopisch | 43—112 |
| 2,376,630 | 5/1945 | Stentz | 256—10 X |
| 2,422,012 | 6/1947 | Greenlee | 256—10 |
| 3,223,796 | 12/1965 | Willoughby | 256—10 X |
| 3,291,897 | 12/1966 | Branley | 256—10 X |
| 3,294,893 | 12/1966 | Shaffer | 174—70 |
| 3,366,854 | 1/1968 | Robinson | 174—70 X |

FOREIGN PATENTS 763,686  12/1956  Great Britain.

DENNIS L. TAYLOR, Primary Examiner

U.S. Cl. X.R.

43—112; 317—362